(12) United States Patent
Hachiya

(10) Patent No.: US 8,797,232 B2
(45) Date of Patent: Aug. 5, 2014

(54) INFORMATION PROCESSING APPARATUS, DISPLAY CONTROL METHOD, AND PROGRAM

(71) Applicant: Kabushiki Kaisha Toshiba, Tokyo (JP)

(72) Inventor: Koji Hachiya, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/900,911

(22) Filed: May 23, 2013

(65) Prior Publication Data

US 2013/0249922 A1 Sep. 26, 2013

Related U.S. Application Data

(63) Continuation of application No. 12/780,630, filed on May 14, 2010.

(30) Foreign Application Priority Data

May 15, 2009 (JP) .................................. 2009-119046

(51) Int. Cl.
*G09G 5/00* (2006.01)
*G06F 15/16* (2006.01)
*G06F 3/00* (2006.01)
*G06F 5/00* (2006.01)
*G06F 3/14* (2006.01)
G06F 9/44 (2006.01)

(52) U.S. Cl.
CPC ............ *G06F 3/1423* (2013.01); *G06F 3/1438* (2013.01); *G06F 3/1454* (2013.01); *G06F 9/4445* (2013.01)
USPC ............... 345/1.1; 345/502; 710/38; 710/316

(58) Field of Classification Search
CPC ... G06F 3/1423; G06F 3/1438; G06F 3/1454; G06F 9/4445
USPC .............................. 345/1.1, 502; 710/38, 316
See application file for complete search history.

(56) References Cited

U.S. PATENT DOCUMENTS 5,564,002 A 10/1996 Brown
5,682,529 A * 10/1997 Hendry et al. ................ 713/100

(Continued)

FOREIGN PATENT DOCUMENTS

JP 2003-280630 A 10/2003
JP 2003-330591 A 11/2003
JP 2006-350755 A 12/2006

OTHER PUBLICATIONS

Configuring Multiple X Screens on One Card, NVIDIA Accelerated Linux Graphics Driver README and Installation Guide, USA, NVIDIA Corporation, Apr. 20, 2007, Part I. Chapter 15, URL, tfp://downloadnvnidia.com/XFree86/Linux-x86/100/14/03/README/chapter-15.html.

(Continued)

*Primary Examiner* — Henry Tsai
*Assistant Examiner* — Eric Oberly
(74) *Attorney, Agent, or Firm* — Knobbe, Martens, Olson & Bear LLP

(57) ABSTRACT

According to one embodiment, an information processing apparatus having an internal display and a connection module for an external display, includes a storage module configured to store items of virtual desktop information to be displayed on an actual display screen of one of the internal display and the external display and items of information of a display which displays the items of virtual desktop information in association with each other, and a control module configured to read out, from the storage module, an item of virtual desktop information in association with the external display and to supply the item of virtual desktop information in association with the external display to external display upon detecting that the external display is connected to the connection module when one of the items of virtual desktop information is displayed on the actual display screen of the internal display.

4 Claims, 13 Drawing Sheets

(56) References Cited

U.S. PATENT DOCUMENTS

| | | |
|---|---|---|
| 5,818,425 A | 10/1998 | Want et al. |
| 6,864,891 B2 | 3/2005 | Myers |
| 7,439,937 B2 | 10/2008 | Ben-Shachar et al. |
| 7,899,492 B2 | 3/2011 | Wang et al. |
| 2003/0179243 A1* | 9/2003 | Numano ..................... 345/782 |
| 2003/0210285 A1 | 11/2003 | Numano |
| 2009/0309886 A1 | 12/2009 | Sneed |

OTHER PUBLICATIONS

Yoshifumi Sasaki, "I've installed FreeBSD!" SoftwareDesign, Gijutsu-Hyohron Co., Ltd., Japan Oct. 18, 2009, No. 228, pp. 142-149.

Notice of Reasons for Rejection mailed by Japan Patent Office on Aug. 17, 2010 in the corresponding Japanese patent application No. 2009-119046.

* cited by examiner

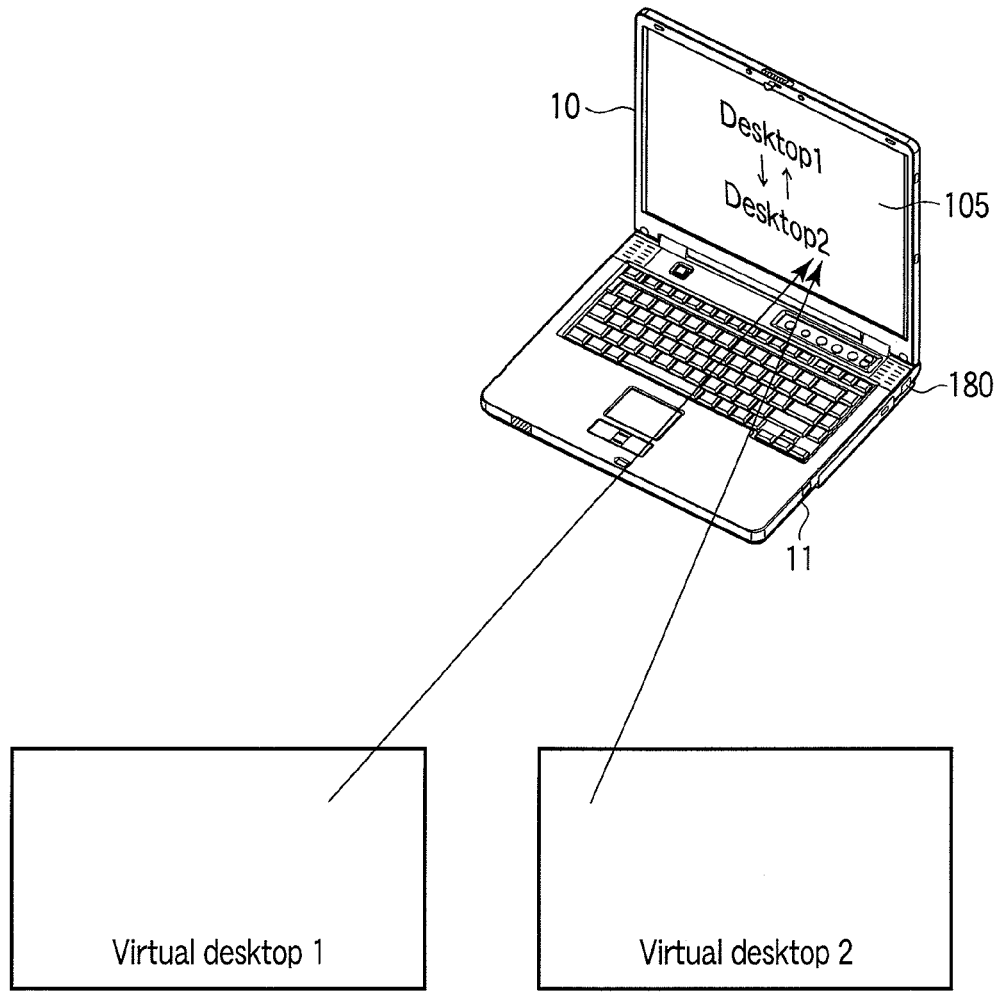
F I G. 1

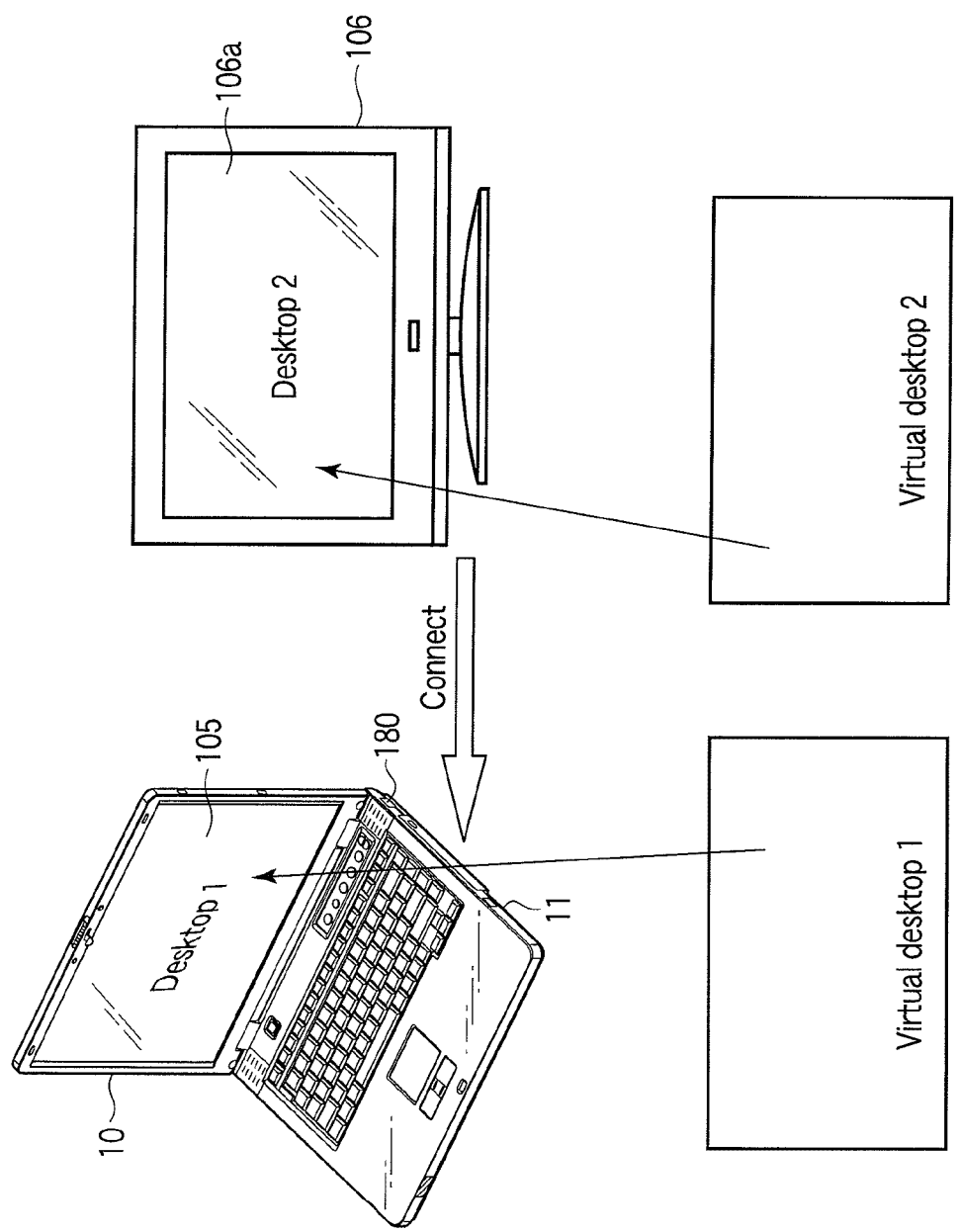
F I G. 2

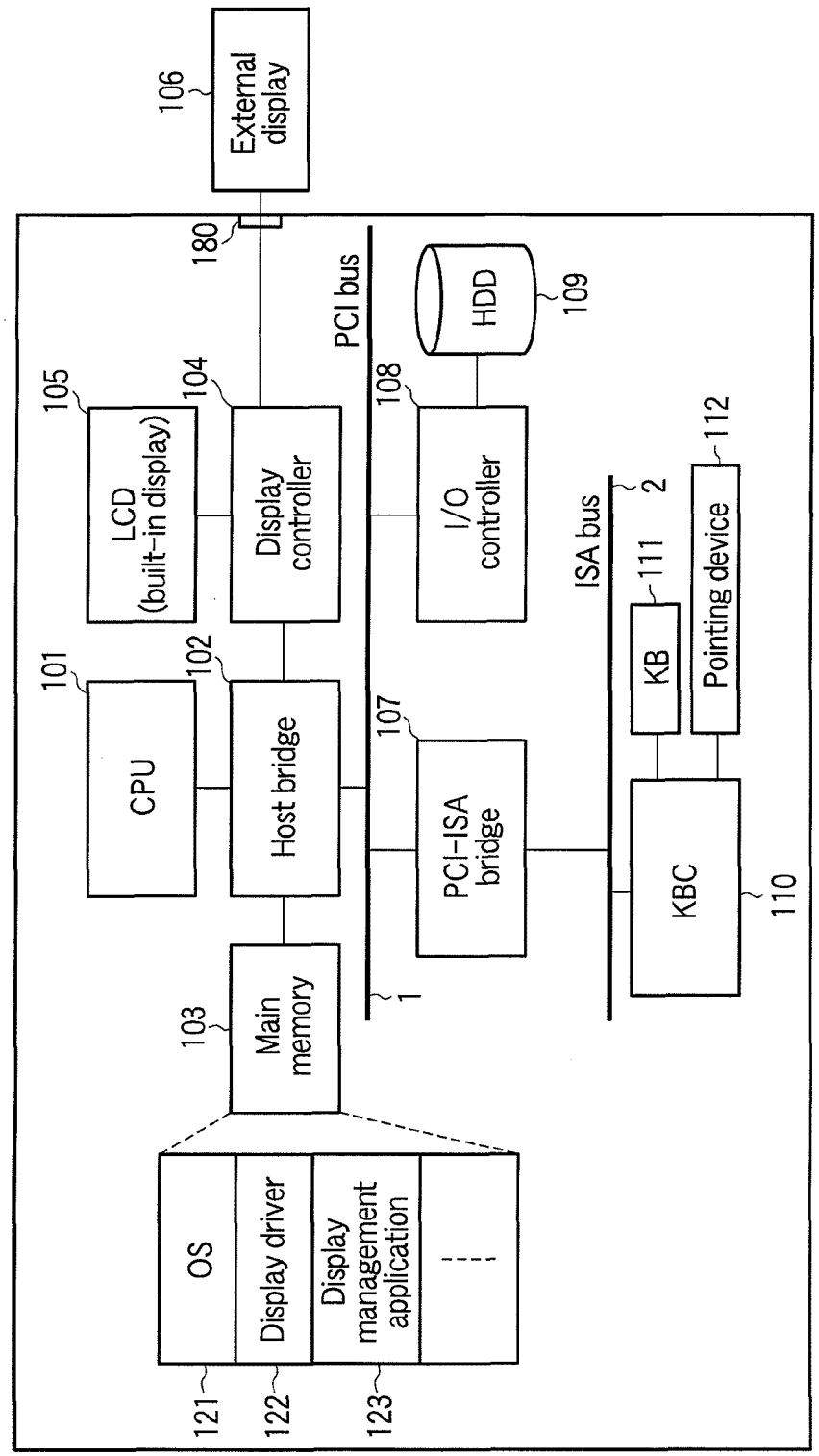
F I G. 3

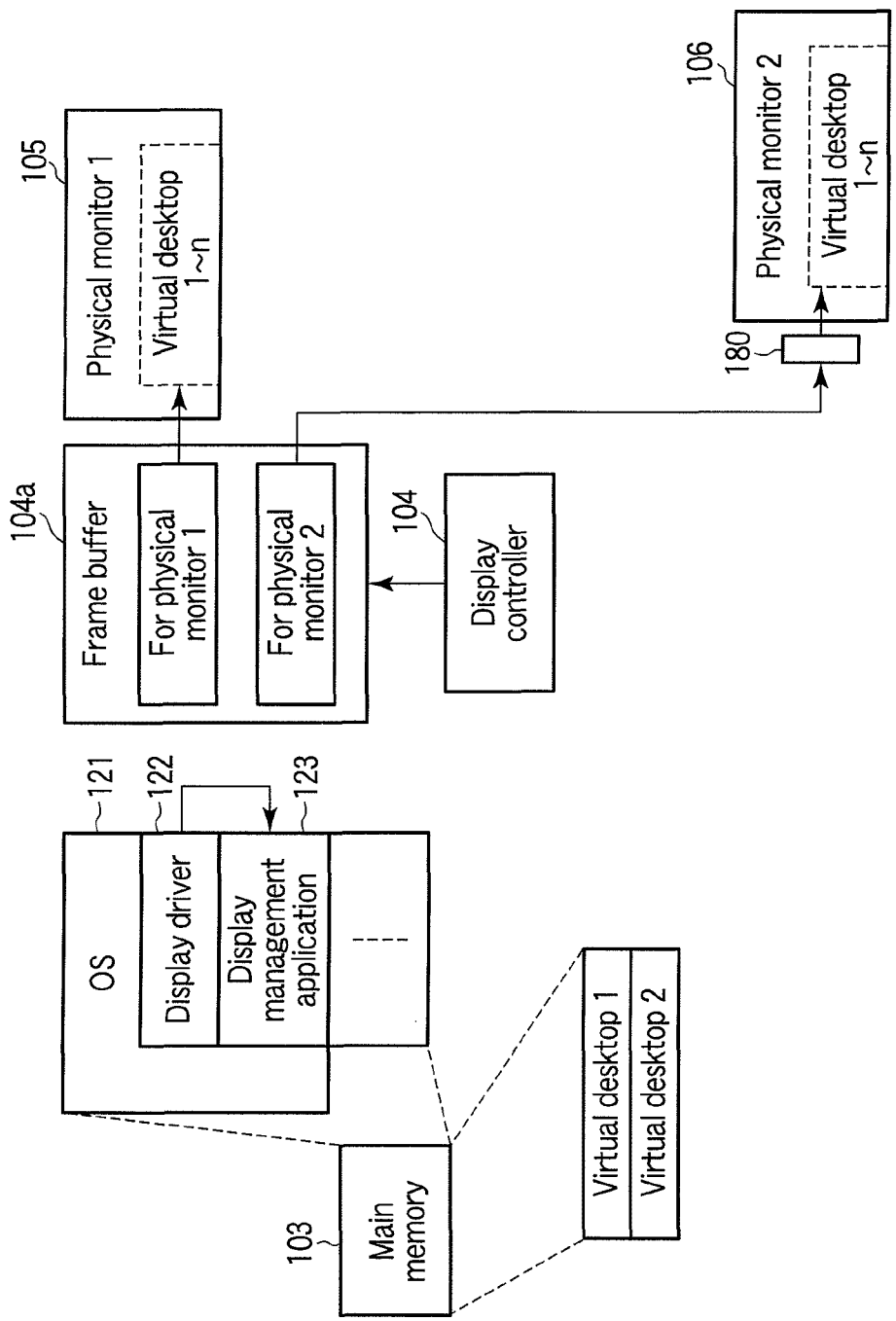
F I G. 4

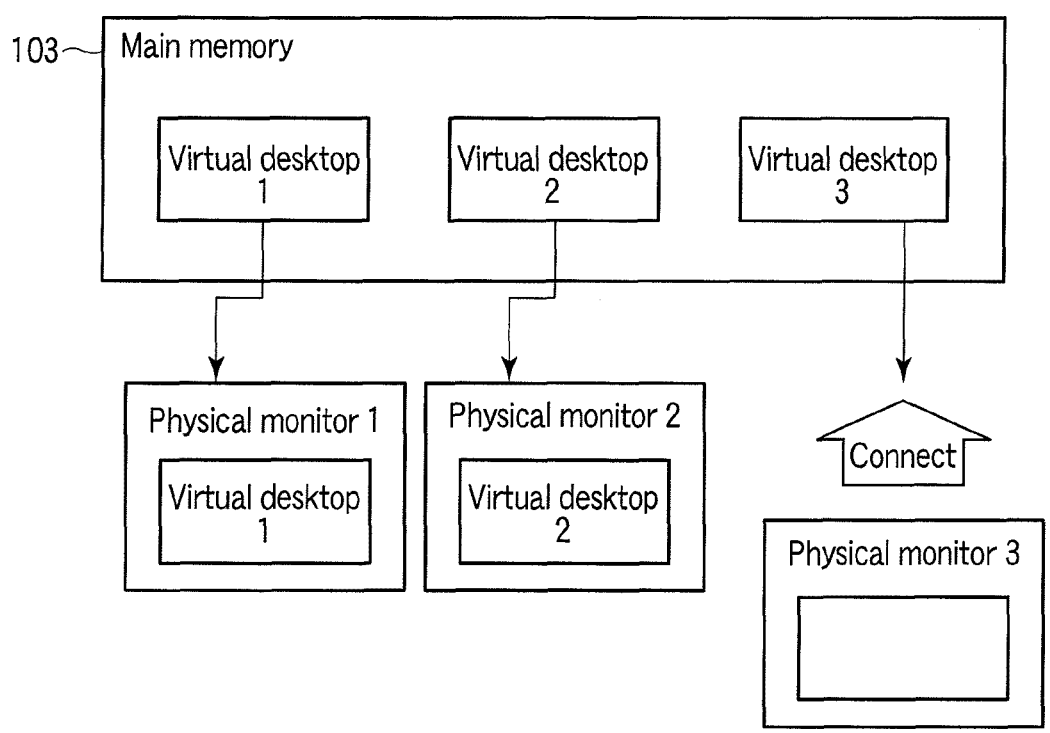
F I G. 11

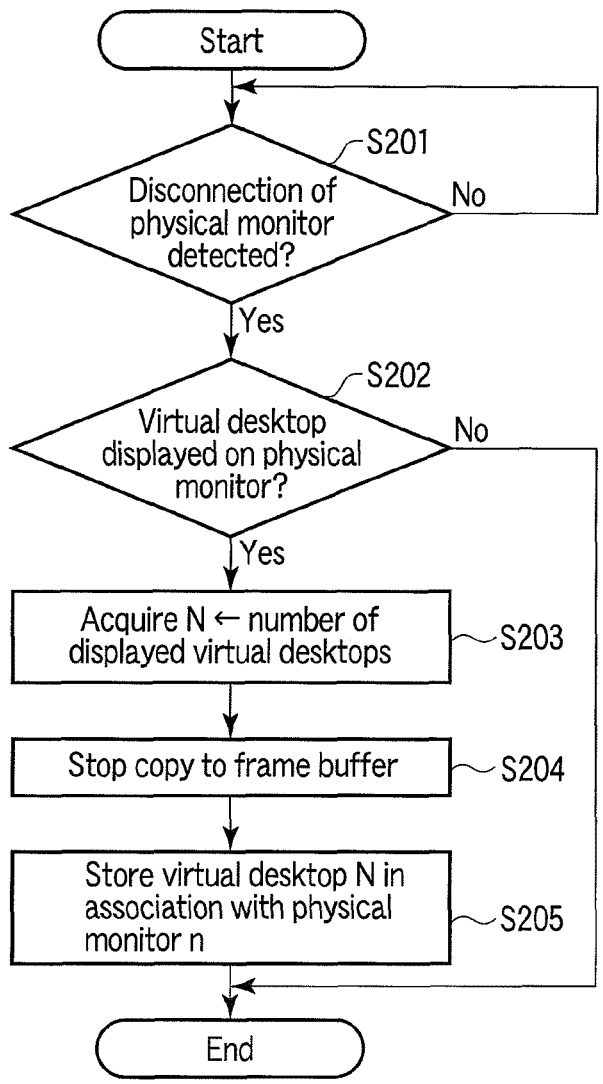
F I G. 12

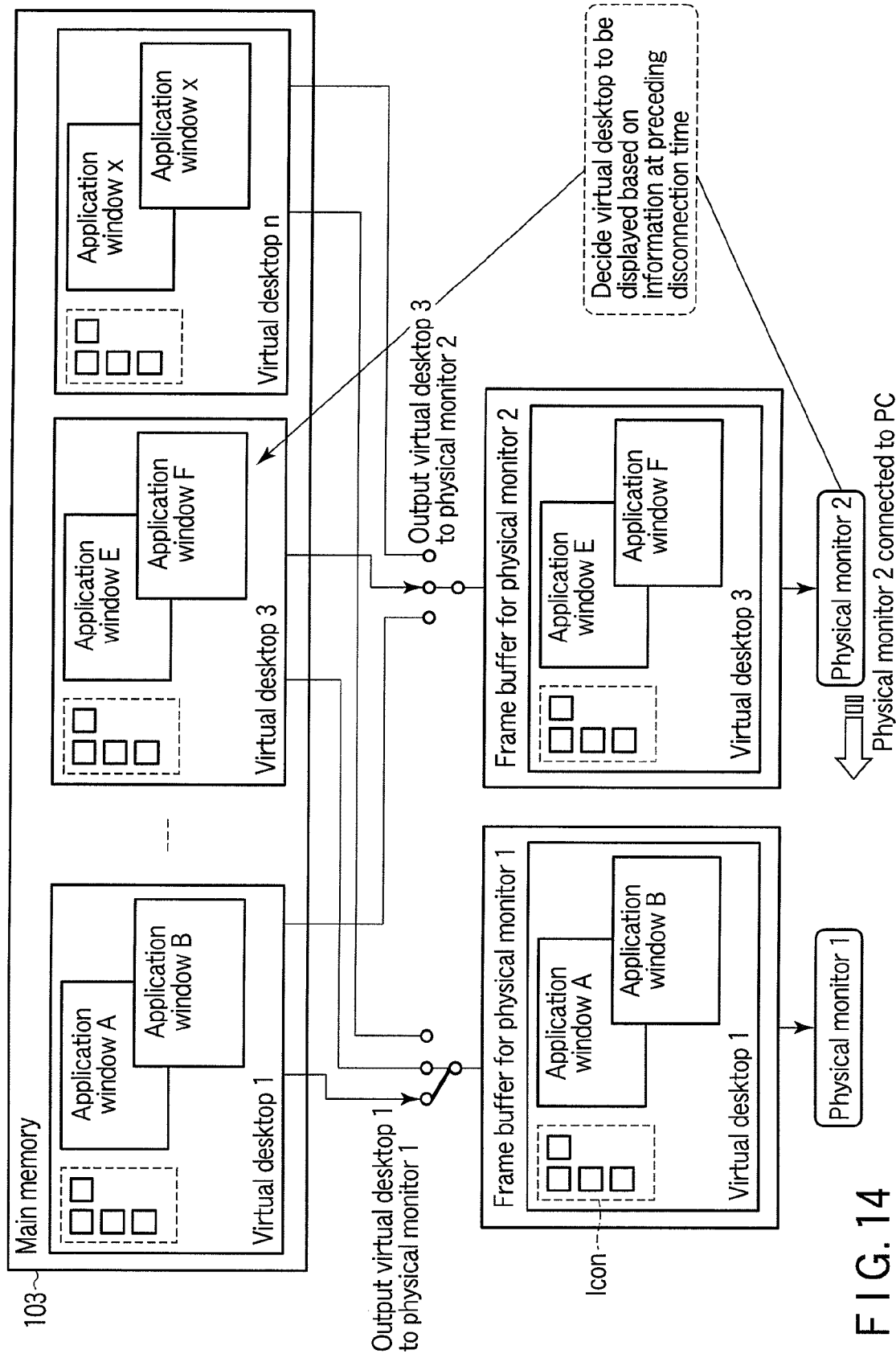
F I G. 14

INFORMATION PROCESSING APPARATUS, DISPLAY CONTROL METHOD, AND PROGRAM

CROSS-REFERENCE TO RELATED APPLICATIONS

This application is a continuation of U.S. patent application Ser. No. 12/780,630, filed May 14, 2010, which is based upon and claims the benefit of priority from Japanese Patent Application No. 2009-119046, filed May 15, 2009, the entire contents of each of which are incorporated herein by reference.

BACKGROUND

1. Field

One embodiment of the present invention relates to an information processing apparatus and a display control method and a display control program.

2. Description of the Related Art

In general, various kinds of notebook or laptop type portable personal computers have been developed. A portable personal computer of this type has a variety of functions for improving operability. One of such functions is a virtual desktop function. The virtual desktop function implements a desktop wider than the actual display screen size by using a virtual screen wider than the actual display screen of the display. In the virtual desktop function, the screen image of a partial display area on the virtual screen is displayed on the display screen (actual display screen) of the display device. It is possible to move the partial display area on the virtual screen, which is displayed on the actual display screen, by moving the mouse pointer to an edge of the actual display screen.

A multi-display system is also one of the virtual desktop functions. The multi-display system is a technique of displaying different screen images on the display screens of two display units such as the built-in or internal display device and external display device of a portable personal computer. Two display areas are allocated to the virtual screen. The screen images of the two display areas are displayed on the two display devices, respectively. For example, Jpn. Pat. Appln. KOKAI Publication No. 2003-280630 discloses a technique of displaying, on the actual display screen of an internal display device and that of an external display device, screen images respectively corresponding to two display areas in a virtual screen rasterized on a video memory.

In Jpn. Pat. Appln. KOKAI Publication No. 2003-280630, however, only one virtual screen can be displayed on the internal display device. In addition, even when an external display device is connected to the computer main body, only the same virtual screen as that on the internal display device can be displayed on the external display device.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view schematically showing an exemplary arrangement of an information processing apparatus according to an embodiment of the present invention.

FIG. 2 is an exemplary view showing an exemplary state in which an external display device is connected to the computer main body shown in FIG. 1.

FIG. 3 is an exemplary block diagram showing an exemplary arrangement of the computer shown in FIG. 1 and an external display device connected to the computer.

FIG. 4 is an exemplary block diagram showing an exemplary arrangement of an OS, display driver, and display management application, a frame buffer using a video memory in a display controller, and physical monitors.

FIG. 11 is an exemplary view showing an exemplary concept of the procedure of deciding the number of the virtual desktop to be displayed on the physical monitor n.

FIG. 12 is an exemplary flowchart illustrating an exemplary processing procedure upon occurrence of a disconnection event of the physical monitor n.

FIG. 14 is an exemplary view showing an exemplary concept of disconnecting the physical monitor and connecting the same physical monitor again.

DETAILED DESCRIPTION

Figure 5:
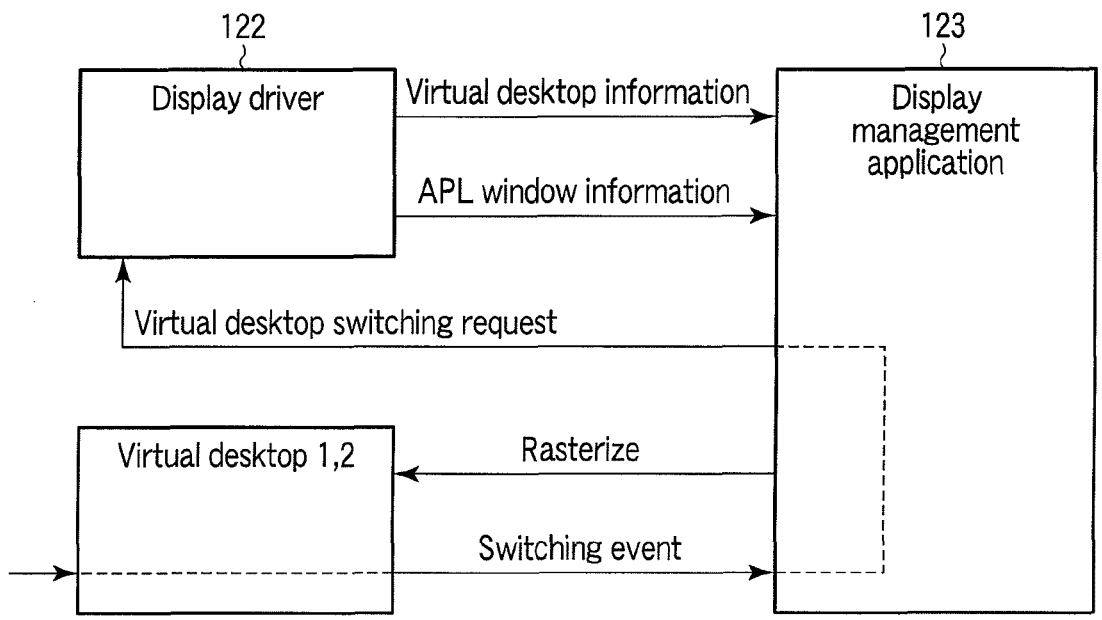
FIG. 5 is an exemplary view showing an exemplary outline of a virtual desktop executed by the display management application of the computer shown in FIG. 1.

Various embodiments according to the invention will be described hereinafter with reference to the accompanying drawings. In general, according to one embodiment of the invention, an information processing apparatus comprising an internal display and a connection module for an external display, comprising a storage module configured to store items of virtual desktop information to be displayed on an actual display screen of one of the internal display and the external display and items of information of a display which displays the items of virtual desktop information in association with each other; and a control module configured to read out, from the storage module, an item of virtual desktop information in association with the external display and to supply the item of virtual desktop information in association with the external display to external display upon detecting that the external display is connected to the connection module when one of the items of virtual desktop information is displayed on the actual display screen of the internal display.

An embodiment of the present invention will now be described with reference to the accompanying drawing.

The arrangement of an information processing apparatus according to an embodiment of the present invention will be explained first with reference to FIG. 1. This information processing apparatus is implemented as, e.g., a notebook type portable personal computer 10. A main body 11 of the computer 10 includes an LCD (Liquid Crystal Display) 105 as a built-in or internal display monitor (display device). The LCD 105 can selectively display a plurality of virtual desktops. For example, it is possible to display a selected one of virtual desktop 1 and virtual desktop 2 on the actual display screen of the LCD 105 in response to a switching request from the user or the like. The computer main body 11 also comprises an external display connection terminal 180 to which an external display device (to be described later) 106 can be connected as needed. Note that the external display connection terminal 180 is normally a connection terminal such as a DVI (Digital Visual Interface) terminal, D-Sub (D-Subminiature) terminal, or HDMI (High-Definition Multimedia Interface) terminal. In this embodiment, a form will be described in which when an external display device is connected to the computer main body which incorporates an internal display device capable of selectively displaying a plurality of virtual screens, different virtual screens are distributed and displayed on the external display device and the internal display device. However, the present invention is not limited to this. For example, the present invention is also applicable to a case in which two or more external display devices are connected to the desktop type computer main body 11.

FIG. 2 is a view showing a state in which the external display 106 is connected to the computer main body 11.

The external display 106 can be connected to the computer main body 11 as needed. The external display 106 is connected to the external display connection terminal 180 of the computer main body 11, as shown in FIG. 2. When connection of the external display 106 is detected in a state in which one (virtual desktop 1) of a plurality of virtual desktops (virtual desktop information) is being displayed on the actual display screen of the LCD 105, a preset virtual desktop, for example, virtual desktop 2 is displayed on an actual display screen 106a of the external display 106. That is, a plurality of virtual desktops can be displayed simultaneously on a plurality of physical displays.

FIG. 3 is a block diagram showing the arrangement of the computer 10 and the external display 106 connected to the computer 10. As shown in FIG. 3, the computer 10 includes a CPU (Central Processing Unit) 101, host bridge 102, main memory 103, display controller 104, PCI-ISA bridge 107, I/O controller 108, HDD (Hard Disk Drive) 109, keyboard controller 110, keyboard (KB) 111, and pointing device 112.

The CPU 101 is a processor provided to control the operation of the computer. The CPU 101 executes various kinds of application programs such as an OS (Operating System) 121, display driver 122, and display management application program (to be also referred to as a display management application hereinafter) 123 which are loaded from the HDD 109 to the main memory 103. The display driver 122 controls the display controller 104 in cooperation with the OS 121. A virtual desktop function is implemented under the control of the display driver 122 and the OS 121.

The virtual desktop function implements display of a plurality of desktops by switching the display screen of the LCD 105. Each desktop can display the windows of a plurality of applications. The screen image data of the virtual desktop is rasterized on a video memory provided in the display controller 104. In the virtual desktop function, the screen image of the display area of one virtual desktop is displayed on the display screen (actual display screen) of the LCD 105. Simultaneously pressing predetermined keys, for example, a function key and the F8 key on the keyboard enables to switch the virtual desktop to be displayed on the actual display screen.

The OS 121 supports a multi-display system. The OS 121 performs control for the multi-display using the display driver 122 and the display controller 104. The display controller 104 incorporates two graphics engines. The display controller 104 displays screen images corresponding to the two virtual desktops rasterized on the video memory on the actual display screen of the LCD 105 and that of the external display 106, respectively, under the control of the display driver 122. Note that when executing multi-display, in correspondence with the number of displays (for example, n displays) to be used in the multi-display, n numbers of graphics engines and n numbers of virtual desktops to be rasterized on the video memory are necessary. The host bridge 102 is a bridge device which bidirectionally connects a PCI bus 1 and the local bus of the CPU 101. The host bridge 102 also incorporates a memory controller configured to control the main memory 103. The PCI-ISA bridge 107 is a bridge device which bidirectionally connects the PCI bus 1 and an ISA bus 2. The PCI-ISA bridge 107 also incorporates various system devices such as a system timer, DMA controller, and interrupt controller. The I/O controller 108 incorporates, e.g., an IDE controller configured to control the HDD 109. The keyboard controller (KBC) 110 controls the keyboard (KB) 111 and the pointing device 112.

FIG. 4 is a block diagram showing the arrangement of the OS 121, display driver 122, and display management application 123 which are loaded to the main memory 103, a frame buffer (buffer memory) 104a using the video memory in the display controller 104, and physical monitors 1 and 2. Note that, for example, physical monitor 1 is the LCD 105, and physical monitor 2 is the external display 106. In this embodiment, the display management application 123 is used as a program to control the virtual desktop function. Like the OS 121 and the display driver 122, the display management application 123 is loaded from the HDD 109 to the main memory 103 and executed by the CPU 101. The display management application 123 displays a virtual desktop on the actual display screen of a physical monitor. The HDD 109 stores a plurality of virtual desktops to be displayed on the actual display screens of the LCD 105 and the external display 106 in association with the information of the display destination units of the plurality of virtual desktops. Upon detecting connection of the external display 106 to the external display connection terminal 180 in a state in which one of the plurality of virtual desktops is being displayed on the actual display screen of the LCD 105, the display management application 123 reads out, from the HDD 109, a virtual desktop stored in association with the external display 106 serving as a target display unit for displaying the virtual desktop, and displays it on the actual display screen of the external display 106. Upon detecting detachment of the external display 106 from the external display connection terminal 180, the display management application 123 stores the virtual desktop displayed on the actual display screen of the external display 106 in the HDD 109 in association with the external display 106 serving as a target display unit for displaying the virtual desktop. Upon receiving a switching request in a state in which virtual desktops are being displayed on the actual display screens of the LCD 105 and the external display 106, the display management application 123 switches the virtual desktop displayed on the actual display screen of the display device, which has received the switching request, to another virtual desktop information. For example, upon receiving a switching request in a state in which the LCD 105 is displaying virtual desktop 1, the virtual desktop is switched to, e.g., virtual desktop 2 so that virtual desktop 2 is displayed on the actual display screen of the LCD 105.

The main memory 103 receives an instruction from the display management application 123 and loads the screen images of the plurality of virtual desktops, for example, virtual desktop 1 and virtual desktop 2. The loaded screen images of virtual desktops 1 and 2 are transferred to storage areas for physical monitors which are allocated to the frame buffer 104a, for example, storage areas for physical monitor 1 and physical monitor 2. To display virtual desktops 1 and 2 on the actual display screens of the LCD 105 (physical monitor 1) and the external display 106 (physical monitor 2), respectively, control is performed in the following way. Virtual desktops 1 and 2 are temporarily stored in the storage areas for physical monitors 1 and 2, which are the storage areas of the frame buffer 104a. The display controller 104 then sends the screen images of virtual desktops 1 and 2 temporarily stored in the storage areas for physical monitors 1 and 2 in the frame buffer 104a to the LCD 105 and the external display 106. For example, if a switching request is received in a state in which virtual desktops 1 and 2 are being displayed on the actual display screens of the LCD 105 and the external display 106, respectively, one of the virtual desktops 1 to n which is displayed on the actual display screen of the display unit which receives the switching request is switched to another of the virtual desktops 1 to n. That is, the display devices (LCD 105 and external display 106) can independently switch and display virtual desktops.

An outline of virtual desktop display processing executed by the display management application 123 will be described next with reference to FIG. 5.

The display driver 122 manages virtual desktop information and APL (application) window information. The virtual desktop information is management information to manage the display image of each virtual desktop, the target display device for displaying each virtual desktop, and the like. The APL window information is management information associated with each application window on a virtual desktop. More specifically, the APL window information manages coordinates representing the current position of each application window, window sizes, program names, and the like.

The display management application 123 periodically acquires the virtual desktop information and APL window information from the display driver 122. Based on the acquired virtual desktop information and APL window information, the display management application 123 controls to display virtual desktops 1 and 2 on the LCD 105 and the external display 106 (physical monitors 1 and 2), respectively. The display management application 123 also rasterizes application window frames on displayed virtual desktops 1 and 2. With this operation, the screen image data of each virtual desktop including the application window frames is created. The created screen images of virtual desktops 1 and 2 are transferred to and stored in the storage areas for the physical monitors on the frame buffer 104a. The screen images are displayed on the actual display screens of the LCD 105 and the external display 106.

When a virtual desktop display switching event occurs on a physical monitor (i.e., when the user presses, e.g., a function key and the F8 key on the keyboard), the display management application 123 changes the virtual desktop on the physical monitor to another virtual desktop in accordance with the operation. The display management application 123 thus updates the screen image on the actual display screen of the LCD 105 or external display 106 where the switching event occurs. In this case, the display management application 123 issues a virtual desktop display switching request to the display driver 122. In this way, the display management application 123 instructs the display driver 122 to switch the virtual desktop displayed on the actual display screen of the LCD 105 or external display 106.

A series of virtual desktop processing procedures to be executed by the display management application will be described next with reference to FIGS. 6 to 9.

<Physical Monitor Connection Procedure>

Figure 7:
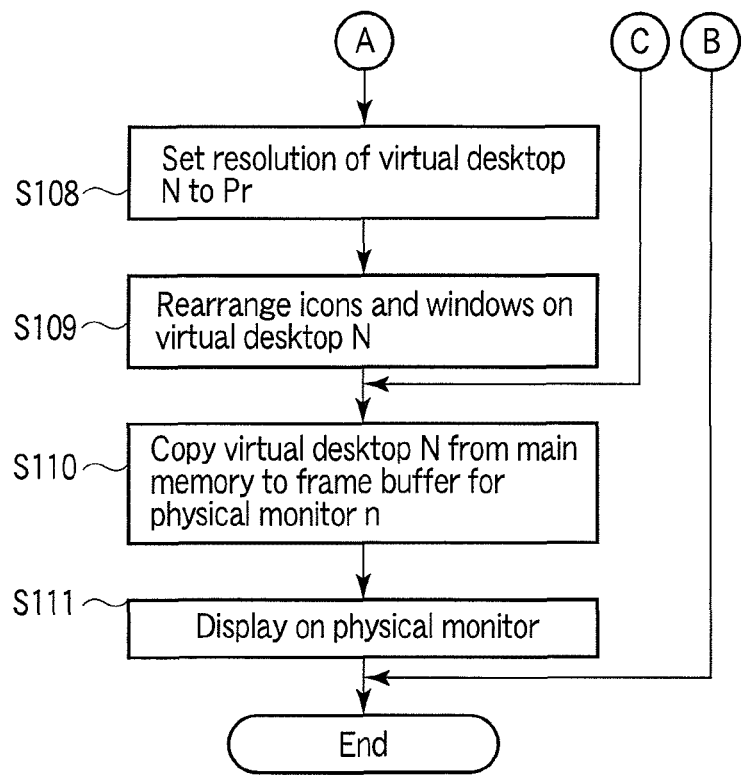
FIG. 7 is an exemplary flowchart illustrating an exemplary virtual desktop processing procedure when connecting a physical monitor.
Figure 6:
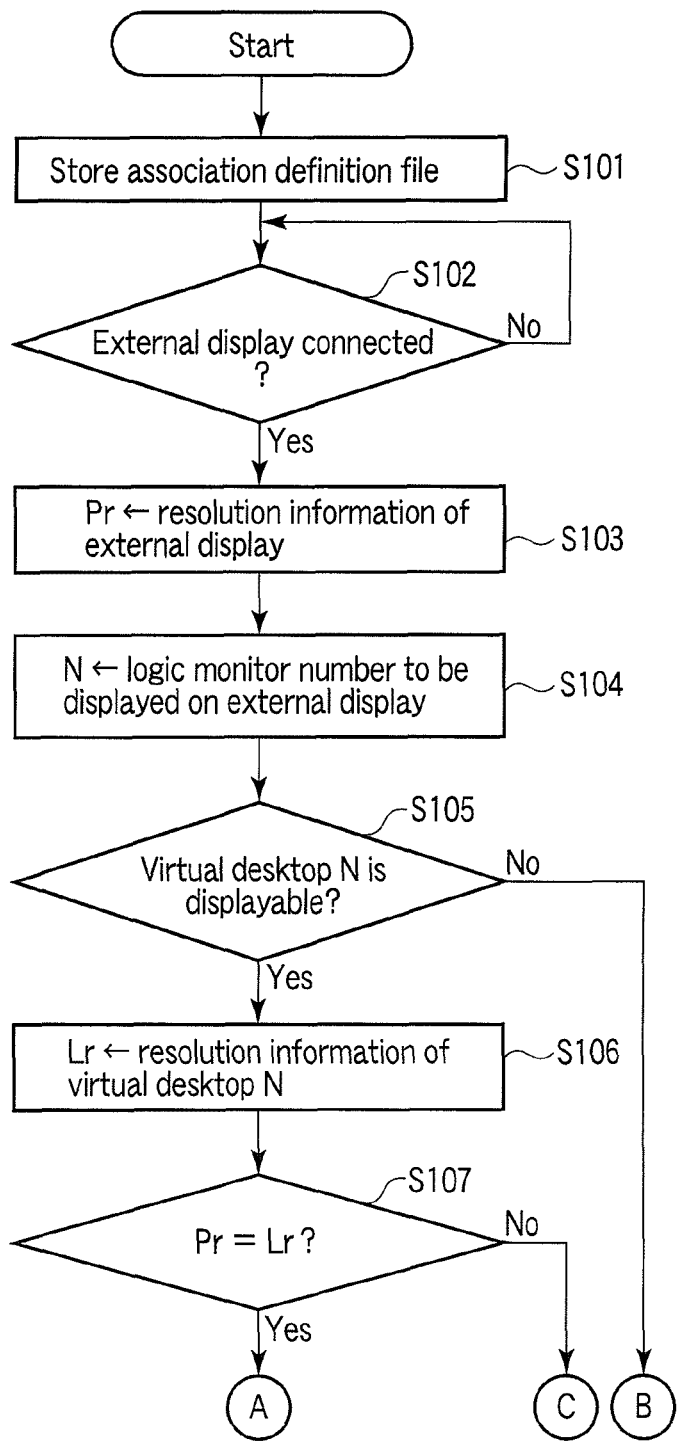
FIG. 6 is an exemplary flowchart illustrating an exemplary virtual desktop processing procedure when connecting a physical monitor.

FIGS. 6 and 7 are flowcharts illustrating a virtual desktop processing procedure when connecting a physical monitor. First, the CPU 101 starts up the display management application 123 and loads it to the main memory 103. The display management application stores an association definition file of virtual desktops and target display devices (block S101). The definition file is association information representing which one of the plurality of virtual desktops should be preferentially displayed on which display device. Next, the display management application 123 determines whether the external display 106 is connected to the external display connection terminal 180 of the computer 10 (block S102). Upon determining in block S102 that the external display 106 is connected to the external display connection terminal 180 of the computer 10 (YES in block S102), the display management application 123 stores resolution information Pr of the external display 106 in, e.g., the main memory 103 (block S103). The resolution information represents, e.g., 800×600 or 1024×768. The display management application 123 then decides a logic monitor number to be displayed on the external display 106 (block S104). The procedure of deciding the logic monitor number is necessary when, for example the physical monitor 106 associated by the above-described definition file is in use. The logic monitor number deciding procedure of the display management application 123 will be described later in detail with reference to FIG. 10. Next, the display management application 123 determines whether a virtual desktop N is displayable (block S105). In block S105, it is determined whether the virtual desktop N is already displayed and used on a physical monitor such as the LCD 105. Upon determining that the virtual desktop N is displayable (YES in block S105), the display management application 123 stores resolution information Lr of the virtual desktop N in, e.g., the main memory 103 (block S106). The display management application 123 compares the resolution information Pr of the external display 106 with the resolution information Lr of the virtual desktop N and determines whether the resolutions are the same (block S107). Upon determining in block S107 that the resolution information Pr of the external display 106 and the resolution information Lr of the virtual desktop N do not represent the same resolution (NO in block S107), the display management application 123 sets the resolution of the virtual desktop N to Pr (block S108). That is, the resolution of the virtual desktop N is set to be equal to that of the external display 106. The display management application 123 rearranges icons and windows on the virtual desktop N (block S109). Subsequently, the display management application 123 copies the virtual desktop N from the main memory 103 to the frame buffer 104a for the physical monitor n (block S110). The display controller 104 sends the virtual desktop N from the frame buffer 104a for the physical monitor n to the physical monitor n and displays the virtual desktop N on it (block S111). In this case, the virtual desktop N is displayed on the physical monitor n in accordance with the above-described definition file.

Figure 8:
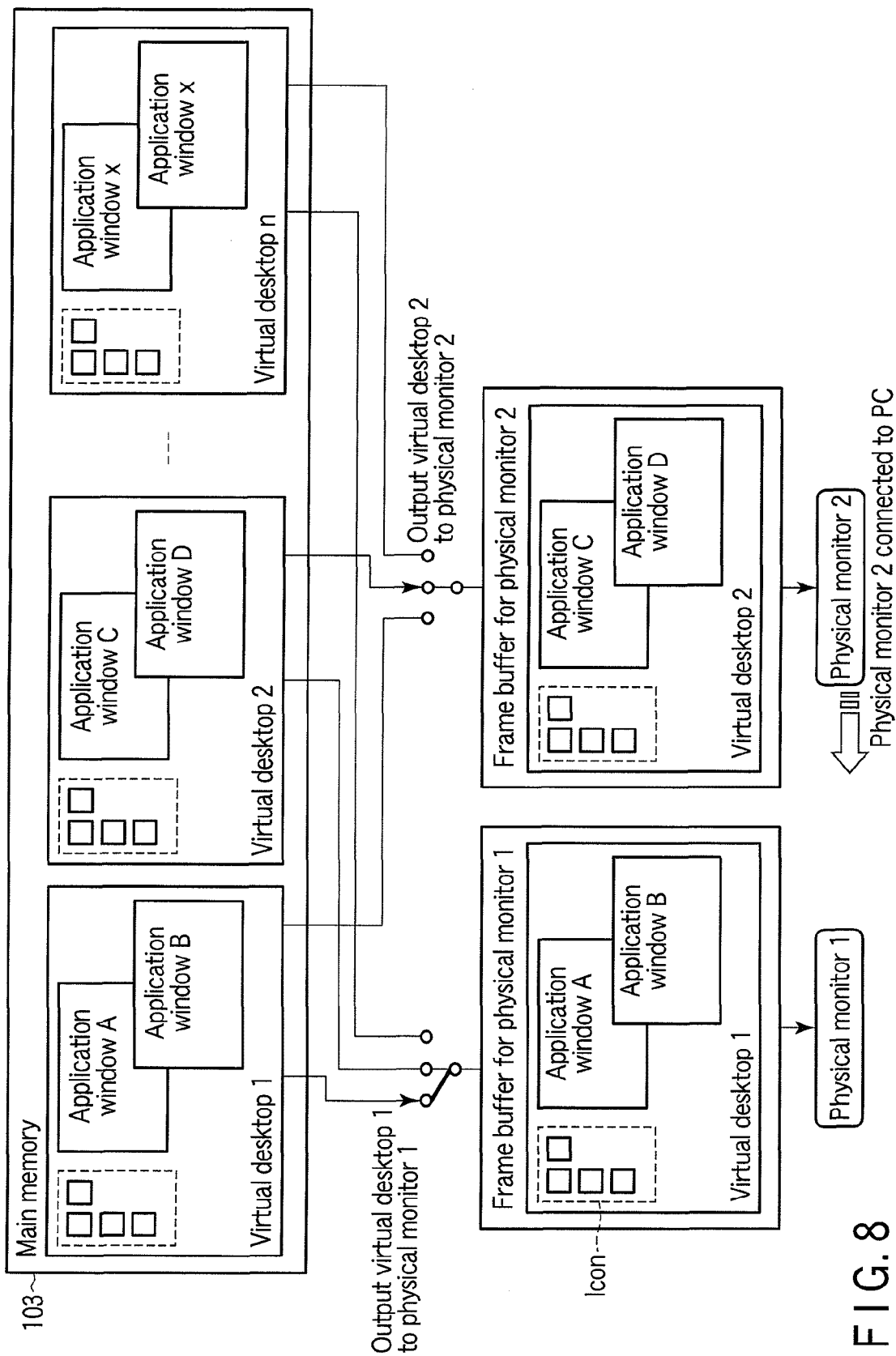
FIG. 8 is an exemplary view schematically showing an exemplary procedure of displaying a virtual desktop N on a physical monitor in accordance with a definition file.
Figure 9:
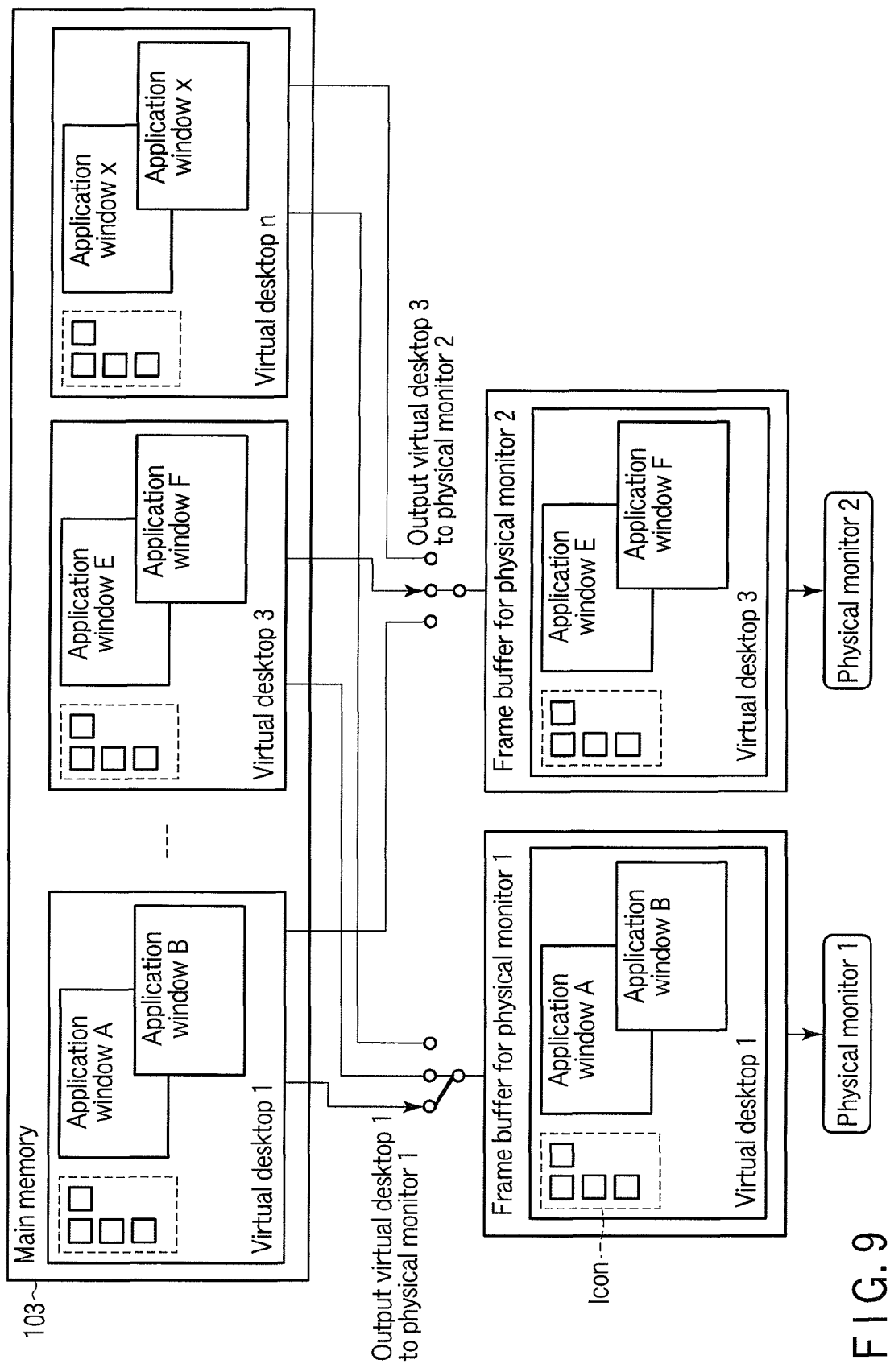
FIG. 9 is an exemplary view schematically showing an exemplary procedure of displaying the virtual desktop N on a physical monitor in accordance with the definition file.

FIGS. 8 and 9 are views schematically showing a procedure of displaying the virtual desktop N on a physical monitor in accordance with the definition file. Assume that the definition file associates the virtual desktop 1 with the physical monitor 1 (LCD 105) and the virtual desktop 2 with the physical monitor 2 (external display 106). In this case, the display management application 123 copies the virtual desktops 1 and 2 temporarily stored in the main memory 103 to the storage area for the physical monitor 1 and the storage area for the physical monitor 2 in the frame buffer 104*a*, respectively, as shown in FIG. 8. The display controller 104 sends, to the physical monitors 1 and 2, the virtual desktops 1 and 2 copied to the storage area for the physical monitor 1 and the storage area for the physical monitor 2 in the frame buffer 104*a*. That is, the virtual desktop 1 is displayed on the physical monitor 1 (LCD 105), and the virtual desktop 2 is displayed on the physical monitor 2 (external display 106). Assume that the definition file associates the virtual desktop 1 with the physical monitor 1 (LCD 105) and the virtual desktop 3 with the physical monitor 2 (external display 106). In this case, the display management application 123 copies the virtual desktops 1 and 3 temporarily stored in the main memory 103 to the storage area for the physical monitor 1 and the storage area for the physical monitor 2 in the frame buffer 104*a*, respectively, as shown in FIG. 9. The display controller 104 sends, to the physical monitors 1 and 2, the virtual desktops 1 and 3 copied to the storage area for the physical monitor 1 and the storage area for the physical monitor 2 in the frame buffer 104*a*. That is, the virtual desktop 1 is displayed on the physical monitor 1 (LCD 105), and the virtual desktop 3 is displayed on the physical monitor 2 (external display 106).

On the other hand, if the display management application 123 determines in block S107 of FIG. 6 that the resolution information Pr of the external display 106 and the resolution information Lr of the virtual desktop N represent the same resolution (YES in block S107), the process advances to block S110.

The above-described procedure allows to simultaneously display different virtual desktops on a plurality of physical monitors.

<Procedure of Deciding Number of Virtual Desktops to be Displayed on Physical Monitor n>

Figure 10:
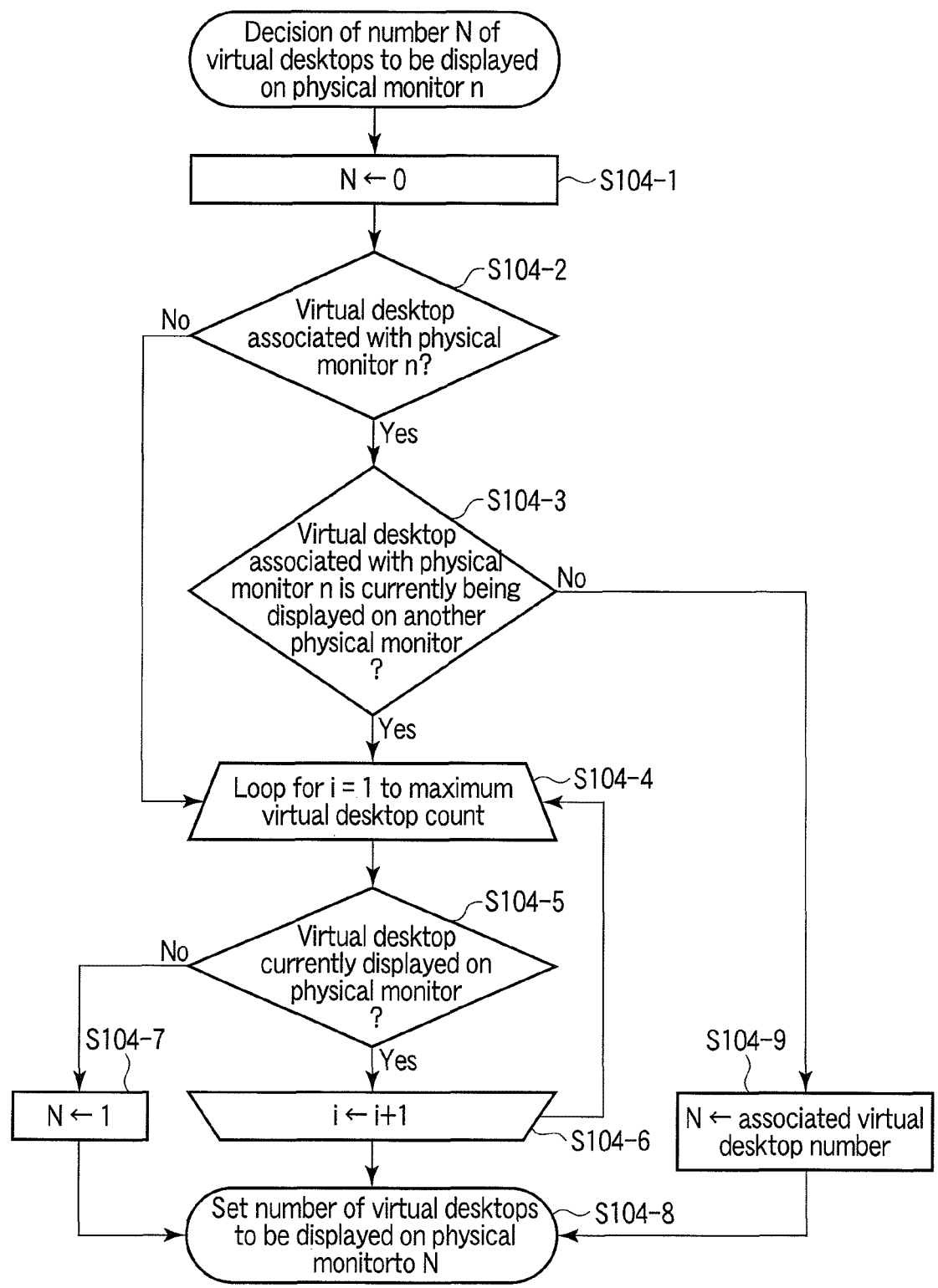
FIG. 10 is an exemplary flowchart illustrating an exemplary procedure of deciding the number N of the virtual desktop to be displayed on a physical monitor n.

FIG. 10 is a flowchart illustrating the above-described procedure of deciding the number N of the virtual desktops to be displayed on the physical monitor n in block S104. First, the display management application 123 resets the number N of the virtual desktops to 0 (block S104-1). The display management application 123 then determines by referring to the above-described definition file whether a virtual desktop associated with the physical monitor n exists (block S104-2). Upon determining in block S104-2 that a virtual desktop associated with the physical monitor n exists (YES in block S104-2), i.e., if a corresponding virtual desktop is temporarily stored in the main memory 103, the display management application 123 determines whether the virtual desktop associated with the physical monitor n is currently being displayed on another physical monitor (block S104-3). Upon determining in block S104-3 that the virtual desktop associated with the physical monitor n is currently being displayed on another physical monitor (YES in block S104-3), i=1 is set, and a loop processing is executed up to the maximum number of virtual desktops (maximum virtual desktop count) (block S104-4). The maximum number of virtual desktops is, e.g., 3.

FIG. 11 is a view showing the concept of the procedure of deciding the number of the virtual desktops to be displayed on the physical monitor n. As shown in FIG. 11, if association is done, for example, as follows by the association information of the definition file, the virtual desktops 1 and 2 are displayed on the physical monitors 1 and 2.

The virtual desktop 1 is displayed on the physical monitor 1

The virtual desktop 2 is displayed on the physical monitor 2

The virtual desktop 3 is displayed on the physical monitor 3

Upon newly detecting connection of physical monitor 3 in this state (FIG. 11), the display management application 123 determines whether a virtual desktop i is currently being displayed on any one of the physical monitors (block S104-5). For example, if i=1, the virtual desktop 1 is being displayed on the physical monitor 1. Hence, the display management application 123 determines in block S104-5 that the virtual desktop i is currently being displayed on any one of the physical monitors (YES in block S104-5). The display management application 123 increments i by one (block S104-6) to set i=2. When i=2, the display management application 123 determines again whether the virtual desktop i is currently being displayed on any one of the physical monitors (block S104-5). If i=2, the virtual desktop 2 is being displayed on the physical monitor 2. Hence, the display management application 123 determines in block S104-5 that the virtual desktop i is currently being displayed on any one of the physical monitors (YES in block S104-5). The display management application 123 increments i by one (block S104-6) to set i=3. When i=3, the display management application 123 determines again whether the virtual desktop i is currently being displayed on any one of the physical monitors (block S104-5). If i=3, the virtual desktop 3 is not being displayed on any physical monitor. Hence, the display management application 123 determines in block S104-5 that the virtual desktop i is not currently being displayed on any one of the physical monitors (NO in block S104-5), and sets N to i=3 (block S104-7). The number of the virtual desktop to be displayed on the physical monitor n=3 is N=3 (block S104-8). On the other hand, if the display management application 123 determines in block S104-3 that the virtual desktop associated with the physical monitor n is not currently being displayed on another physical monitor (NO in block S104-3), the virtual desktop number N is decided in accordance with the above-described definition file (block S104-9).

<Processing Procedure Upon Occurrence of Disconnection Event of Physical Monitor n>

FIG. 12 is a flowchart illustrating a processing procedure upon occurrence of a disconnection event of the physical monitor n. First, the display management application 123 monitors disconnection of the physical monitor n. Disconnection of the physical monitor n is detected when the display controller 104 detects removal of the monitor cable from the external display connection terminal 180 and notifies the display management application 123 of the disconnection of the physical monitor n via the OS 121 and the display driver 122. Upon detecting disconnection of the physical monitor n (YES in block S201), the display management application 123 determines whether a virtual desktop has been displayed on the physical monitor n (block S202). If it is determined in block S202 that a virtual desktop has been displayed on the physical monitor n (YES in block S202), the display management application 123 acquires the number of the displayed virtual desktops as N (block S203). The display management application 123 stops processing of copying the screen image of the virtual desktop to the frame buffer 104*a* (block S204). The display management application 123 stores the virtual desktop N in, e.g., the HDD 109 in association with the physical monitor n (block S205).

Figure 13:
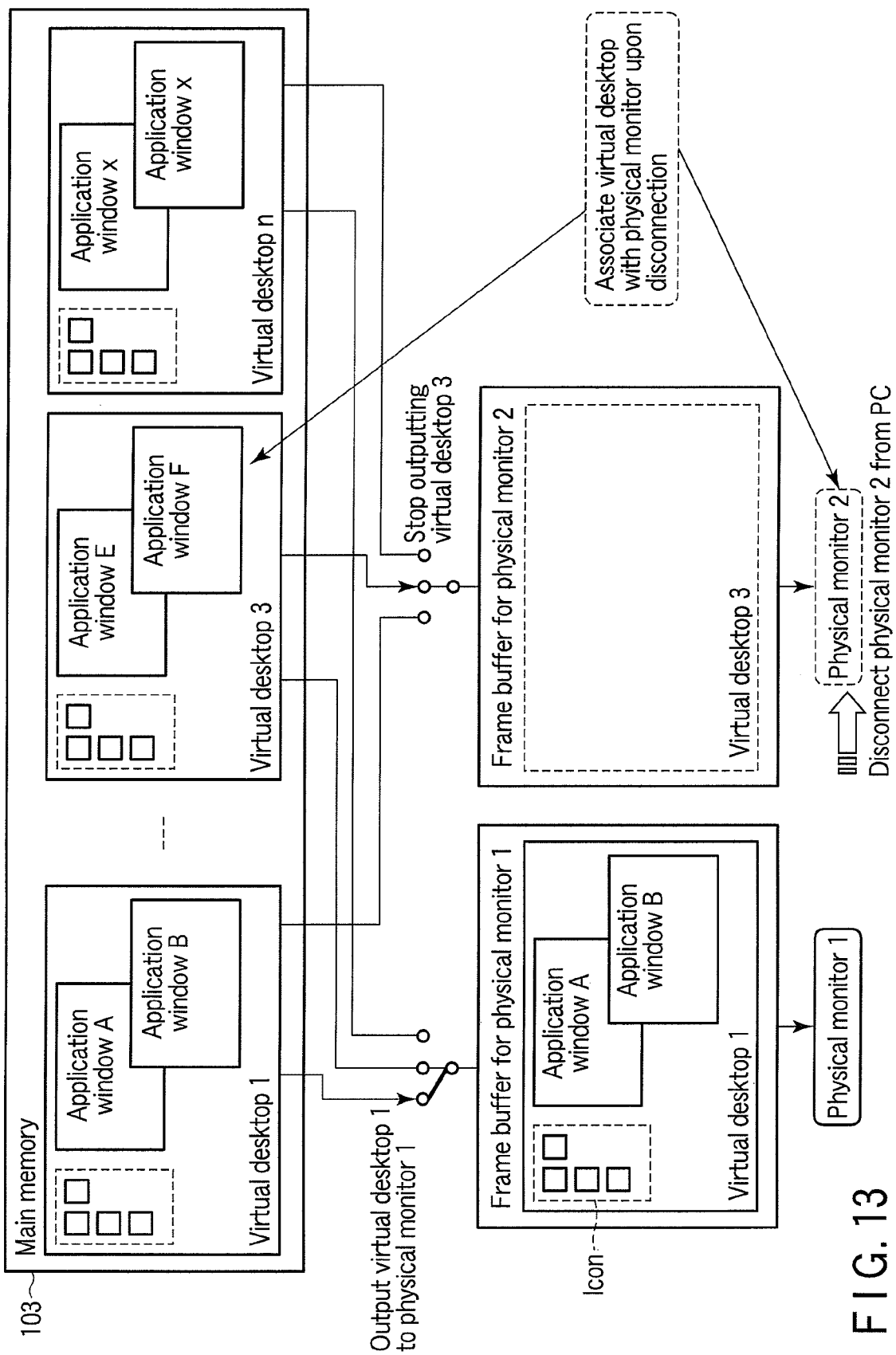
FIG. 13 is an exemplary view showing an exemplary concept of storing the virtual desktop N in, e.g., an HDD in association with the physical monitor n.

FIG. 13 is a view showing a concept of causing the display management application 123 to store the virtual desktop N in, e.g., the HDD 109 in association with the physical monitor n upon detecting disconnection of the physical monitor n. For example, if it is determined that physical monitor 2 is disconnected when the virtual desktop 3 is displayed on it, the virtual desktop 3 and physical monitor 2 are associated and stored in, e.g., the HDD 109 as the definition file. If the definition file is different from that stored in advance, the file is overwritten (before overwrite, a message may be displayed to prompt the user to select whether to execute the overwrite).

FIG. 14 is a view showing a concept of disconnecting physical monitor 2 when the virtual desktop 3 is displayed on it and then connecting physical monitor 2 again. If the physical monitor 2 is disconnected when the virtual desktop 3 is displayed on it and then connected again, the virtual desktop 3 is displayed on the physical monitor 2 by referring to the definition file. That is, the virtual desktop to be displayed on the physical monitor 2 is decided based on the information of connection at the preceding disconnection time (latest physical monitor connection).

According to the above-described embodiment, when an external display is connected to the computer main body which incorporates an internal display device capable of selectively displaying a plurality of virtual screens, different virtual screens can be distributed and displayed on the external display and the internal display device. That is, it is possible to simultaneously display different virtual desktops on a plurality of physical monitors. Additionally, the virtual desktop and the multi-display environment can cooperate seamlessly. When an additional physical monitor is connected when a plurality of virtual desktops are in use, the virtual desktop areas can automatically be displayed on the monitors. If the physical monitor is disconnected, the area displayed on that monitor can be saved in the virtual desktop area of, e.g., an LCD serving as a main display device. The user can always ensure a desktop area (work area) in the same state independently of the presence/absence of an external display. It is also possible to quickly restore the user environment by associating a specific virtual desktop with a specific physical monitor and automatically displaying the virtual desktop.

A modification of the above-described embodiment will be explained next.

In the above-described embodiment, the resolution of the virtual desktop is changed to that of the physical monitor. However, the virtual desktop may be displayed on the physical monitor without changing its resolution. In the above-described embodiment, when a physical monitor is connected, a virtual desktop is automatically displayed on it. Instead, a window which prompts the user to select whether to display a screen may be displayed upon connection.

The image processing apparatus of the embodiment is not limited to the computer 10 but can also be implemented by various information processing apparatuses such as a PDA (Personal Digital Assistant). The application programs (e.g., display management application program) can also be stored in a storage medium such as an optical disk or flash memory. A module can be accomplished in software and hardware. In addition, the application program is stored storage medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising an internal display and a connector for an external display, comprising:
   storage configured to store definition information representing which virtual desktops are to be displayed by the external display or the internal display;
   an external display controller configured to read out first definition information representing that a first virtual desktop is to be displayed by the external display device from the storage, and to supply the first definition information to the external display when a connection of the external display to the connector is detected and a second virtual desktop is displayed on the internal display;
   an internal display controller configured to read out second definition information representing that a third virtual desktop is to be displayed at the internal display device from the storage, and to supply the read second definition information to the internal display when a switching request is received and a fourth virtual desktop is displayed on the internal display; and
   a writing module configured to update the definition information such that the definition information represents that a fifth desktop is to be displayed at the external display when a disconnection of the external display from the connector is detected and the external device displays the fifth desktop.

2. The apparatus of claim 1, further comprising:
   a buffer memory configured to temporarily store the virtual desktops, wherein
   the virtual desktops stored in a main memory are copied to storage areas of the buffer memory for the internal display and the external display and then send to the internal display and the external display.

3. A display control method for an information processing apparatus comprising an internal display and a connector for an external display, comprising:
   storing in storage definition information representing which virtual desktops are to be displayed by the external display or the internal display;
   reading out first definition information representing that a first virtual desktop is to be displayed at the external display device from the storage, and supplying the read first definition information to the external display when a connection of the external display to the connector is detected and a second virtual desktop is displayed on the internal display;
   reading out second definition information representing that a third virtual desktop is to be displayed at the internal display device from the storage, and supplying the read second definition information to the internal display when a switching request is received and a fourth virtual desktop is displayed on the internal display; and
   updating the definition information such that the definition information represents that a fifth desktop is to be displayed at the external display when a disconnection of the external display from the connector is detected and the external device displays the fifth desktop.

4. A computer readable non-transitory storage medium having a computer program stored thereon for an information processing apparatus comprising an internal display and a connector for an external display, wherein the computer program causes the information processing apparatus to execute functions comprising:

storing in storage definition information representing which virtual desktops are to be displayed by the external display or the internal display;

reading out first definition information representing that a first virtual desktop is to be displayed at the external display device from the storage, and supplying the first definition information to the external display when a connection of the external display to the connector is detected and a second virtual desktop is displayed on the internal display;

reading out second definition information representing that a third virtual desktop is to be displayed at the internal display device from the storage, and supplying the second definition information to the internal display when a switching request is received and a fourth virtual desktop is displayed on the internal display; and updating the definition information such that the definition information represents that a fifth desktop is to be displayed at the external display when a disconnection of the external display from the connector is detected and the external device displays the fifth desktop.

\* \* \* \* \*